United States Patent

[11] 3,576,404

[72] Inventor Shigeo Akasaka
Tokyo, Japan

[21] Appl. No. 771,231
[22] Filed Oct. 28, 1968
[45] Patented Apr. 27, 1971
[73] Assignee Nippon Kogaku K. K.
Tokyo, Japan
[32] Priority Oct. 31, 1967
[33] Japan
[31] 42/92075

[54] DEVICE FOR OPTICAL AND MAGNETIC SOUND TRACK ON FILM REPRODUCTION
4 Claims, 5 Drawing Figs.

[52] U.S. Cl. .......... 179/100.01, 179/100.2, 179/100.3
[51] Int. Cl. .......... G11b 15/28, G11b 15/66
[50] Field of Search .......... 179/100.2, 100.1 (A), 100.3 (E), 100.3 (C); 226/183, 187, 186

[56] References Cited
UNITED STATES PATENTS

| | | | |
|---|---|---|---|
| 3,047,671 | 7/1962 | Krtars | 179/100.2 |
| 3,352,975 | 11/1967 | Floden | 179/100.2 |
| 3,233,958 | 2/1966 | Kaess | 179/100.2 |
| 2,927,972 | 3/1960 | Delualle | 179/100.2 |

*Primary Examiner*—James W. Moffitt
*Assistant Examiner*—Raymond F. Cardillo, Jr.
*Attorney*—Harry G. Shapiro

ABSTRACT: A sound motion picture projector of the type which employs film having either optical or magnetic sound tracks advanced with the sound track overhanging the sound drum employs means for projecting light through the sound track and detecting means for receiving the light. A magnetic sound head is positioned to engage the sound track as it travels around the drum. A pressure roller presses the sound track portion of the film toward the magnetic sound head. A first pivot lever carries the magnetic sound head an is pivotable perpendicularly to the axis of the sound drum. A second pivot lever carries the pressure roller and is pivotable in parallelism to the first pivot lever. A spring member biases both the pivot levers to urge the magnetic sound head and the pressure roller toward each other so that the magnetic sound head is positioned by the film when the film is engaged by the sound head and roller.

INVENTOR.
SHIGEO AKASAKA
BY Harry G. Shapiro
ATTORNEY

DEVICE FOR OPTICAL AND MAGNETIC SOUND TRACK ON FILM REPRODUCTION

The present invention relates to a device capable of optical and magnetic reproduction with one sound drum in a movie projector having optical sound reproducing means and magnetic sound recording and reproducing means.

In a sound motion picture projector, particularly of the type using miniature film, when the optical recording zone and the magnetic recording zone are in the same position on the film the light must pass through the film's optical recording zone, and when the magnetic recording is carried out, some means must be provided to support the film on its rear side in the sound recording zone. Otherwise, the requisite pressure of the magnetic head cannot be obtained, and suitable reproduction of the sound is not furnished.

To overcome the aforementioned problems, it has been proposed to shift the sound drum in an axial direction. It has also been proposed to provide an adjustment whereby the magnetic head may be shifted when it is desired to obtain optical reproduction. With devices of the former type, the shifting mechanism is unduly complicated. In devices of the latter type, the surface of the fixed roller or the magnetic head to be contacted by the films must be the same surface as the sound drum, and as a result, difficulty is experienced during operation because of the movement imparted to the sound drum or rollers or the tilting of the shaft.

In accordance with this invention, the above-mentioned limitations of the conventional structures are obviated, and the object of this invention is to provide a magnetic recording and reproducing head of simple structure which does not require adjustment.

The invention relates to a device for optical reproduction and the recording and reproduction of magnetic recorded sound wherein a movie film having an optical recording zone at a predetermined position on the film is guided by a sound drum in a manner so that the sound recording portion is not contacted by the drum, and the sound is reproduced by means of a lamp, slit lens, and optical detecting element provided in predetermined positions. Two levers are associated with the sound drum. One end of each lever is rotatably supported upon a common shaft. At the opposite end, one lever carries or supports the magnetic sound head, and the other lever carries or supports a pressure roller so that the sound recording zone is engaged between the sound head and the roller. A spring intermediate the two pivot levers acts to resiliently urge the magnetic sound head and the pressure roller toward each other, whereby the magnetic sound head is positioned solely by the intermediate film when the film is engaged by the sound head and the roller. Manually operable means is provided to disengage the magnetic sound head and the pressure roller from the film against the force of the spring.

In accordance with this invention, the magnetic recording head and the pressure roller resiliently mounted so that the sound head is positioned solely by the film when the film is engaged by the head and roller. Compared with the conventional systems, the structure of this invention is simple, and it is not necessary to employ adjustment means to make the surface of the head press roller become the same as the surface of the sound drum, and it is possible to prevent the deterioration of reproduced sound caused by the decentralization of the sound drum and the roller and by the tilting of the shaft.

In addition to the above, damage is prevented to the optical recording zone caused by the magnetic head or the roller by separating the head and the roller from the film running path.

This invention will be described more clearly referring to an illustrative embodiment shown in the attached drawings, in which.

Figure 1:
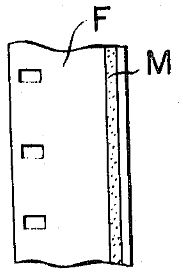
FIG. 1 shows a magnetic recording film.
Figure 2:
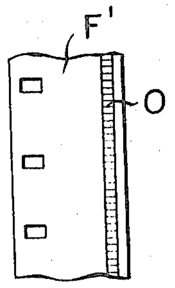
FIG. 2 shows an optical recording film.

In FIG. 1 and FIG. 2, 0 is an optical recording zone, M is a magnetical recording zone and these zones O and M are located at the same position on a film F for miniature movie film, and the light must pass through the optical recording zone O of the film F′ in FIG. 2, while when magnetic recording is carried out, something to support means must be provided film F in FIG. 1; otherwise, the needed pressure of the magnetic head cannot be satisfactorily obtained and consequently the perfect reproduction of sound cannot be expected.

As shown in FIGS. 3, 4 and 5, 1 is a magnetic recording and reproducing sound head; 2 is a sound drum; 3 is a sound drum shaft; 4 is a pressure roller; and 5 is a shaft for supporting the rotatable pressure roller 4. The pressure roller 4 is carried or supported upon a pivot lever 6. The magnetic sound head 1 is carried or supported upon a pivot lever 7. A torsion spring 8 has one end thereof connected to the pivot lever 6, and its other end is connected to the pivot lever 7. As shown, this arrangement causes the roller 4 to be resiliently urged toward the sound head 1. A shaft 9 is provided to pivotally support both the levers 6 and 7 perpendicularly to the axis of the sound drum 2 at the ends of the levers opposite to the ends which support the roller 4 and sound head 1, respectively. A stop 10 is provided for the levers 6 and 7. The shaft 9 is supported upon a base 11. In the showing of FIGS. 3, 4 and 5, 12 indicates a film having a magnetic sound track M, the film being adapted to be advanced with the sound track overhanging the sound drum 1. The sound drum has associated therewith an optical detecting element 13 cooperable with a lens 14 and an exciter lamp 15.

The pivot levers 6 and 7 are arranged like the blades of a pair of scissors and have their free ends resiliently urged together by means of the spring 8. No other external force is imparted to the pivot levers and the pressure roller 5 and sound head 1 respectively supported by the levers. Thus, the positions of the pivot levers is determined solely by the film 12 between the sound head and the pressure roller. A manually operable member 16 having a pin 17 is movable toward and away from the shaft 9 as shown by the arrows in FIGS. 3 and 5. The pin operates as a wedge between the two pivot levers 6 and 7, and in the position shown in FIG. 5, the levers, and thereby the sound head and pressure roller carried by the levers, are separated. The member 16 is connected or interlocked to a switch member (not shown) such as a knob in circuit with the lamp 15 and to furnish magnetic recording and reproduction. The light from the exciter lamp 15 is projected through the lens 14 having an apertured member therein and upon a point of the optical sound track O which overhangs the sound drum 1, whereby the light is received from the detecting element 13 after passing through the sound track of the film.

Figure 3:
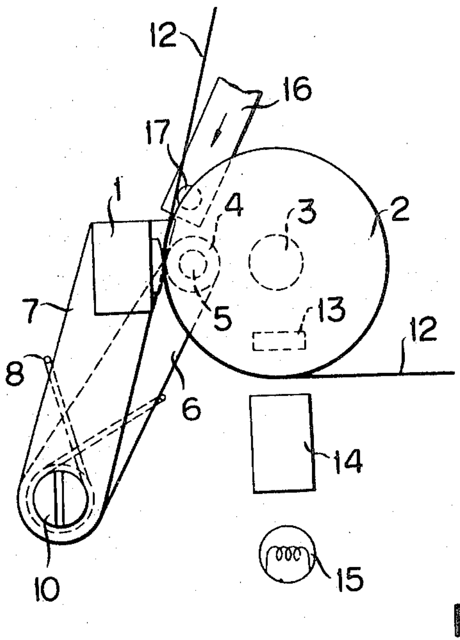
FIG. 3 is a front view of an embodiment of this invention showing the state of magnetic sound recording and reproducing.

In the embodiment of the invention as above described, and with the film 12 running on the sound drum 2 by means of a film driving device (not shown), the film assumes a winding angle as shown in FIG. 3. The sound head 1 and the pressure roller 4 follow the film by pinching it therebetween. Thus, magnetic recording and reproduction may be accomplished.

Figure 5:
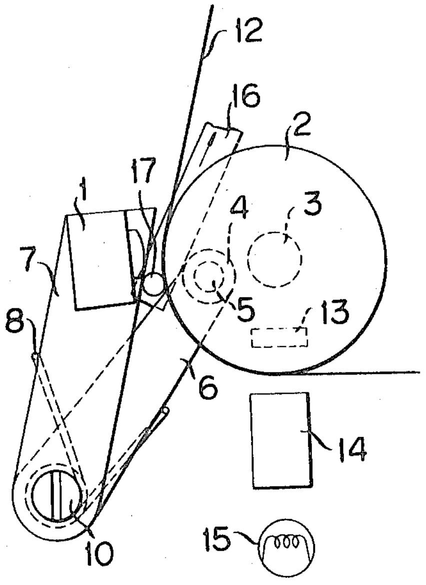
FIG. 5 is a front view as that of FIG. 3, and shows the state of optical sound recording and reproduction.
Figure 4:
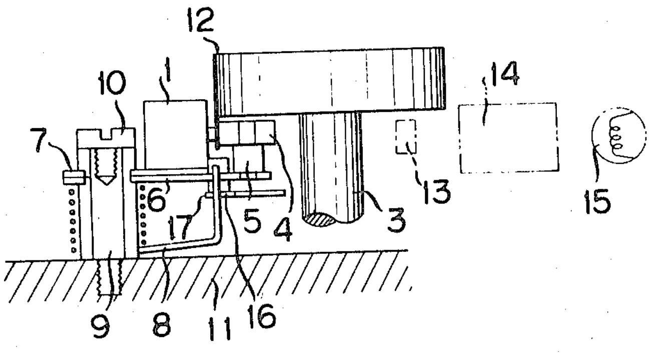
FIG. 4 is a cross-sectional view of FIG. 3.

On the other hand, when optical sound reproduction is to be accomplished, the sound head 1 and the pressure roller 4 are separated as shown in FIG. 5. In this condition, the sound head and the roller are not cooperable with one another. As a result, optical recording and reproduction may be carried out; the light from the exciter lamp 15 passes through the lens 14 to act upon the optical detecting element 13 related to the optical sound track which overhangs the sound drum 2.

I claim:

1. In a sound-type motion picture projector including a sound drum around which a film having sound tracks is adapted to be advanced with said sound tracks overhanging said sound drum, means for projecting light through said sound track of the film traveling around said sound drum and detecting means for receiving the light through said sound track, a magnetic sound recording and reproducing assembly comprising a magnetic sound head positioned to engage the sound track of the film traveling around the sound drum, a pressure roller for pressing the sound track of the film toward the magnetic sound head, a first pivot lever carrying the magnetic sound head and pivotable perpendicularly to the axis of the sound drum, a second pivot lever carrying the pressure roller and pivotable in parallel to said first pivot lever, a single spring member for biasing both of said pivot levers to urge the magnetic sound head and the pressure roller toward each other, each end of the spring member being respectively connected to each of the pivot levers, whereby the magnetic sound head is positioned solely by the film when the film is engaged by said head and said roller, and manually operable means for disengaging the magnetic sound head and the pressure roller from the film against the force of said spring member.

2. The sound-type motion picture projector according to claim 1, wherein said first and second pivot levers are in a scissorslike arrangement pivotally supported by a common shaft on the projector body.

3. The sound-type motion picture projector according to claim 1, wherein said single spring member is a torsion spring provided around said common shaft.

4. The sound-type motion picture projector according to claim 1, wherein the manually operable means includes a pin movable toward said common shaft and inserted between said first and second pivot levers.

UNITED STATES PATENT OFFICE

CERTIFICATE OF CORRECTION

Patent No. 3,576,404 Dated April 27, 1971

Inventor(s) Shigeo Akasaka

It is certified that error appears in the above-identified patent and that said Letters Patent are hereby corrected as shown below:

Column 4, line 8 and line 11 numeral "1", each occurrence, should read--2--.

In Fig. 5, the spring 8 should be related to the pivot levers 6 and 7 in the same way as illustrated in Fig. 3.

Signed and sealed this 2nd day of May 1972.

(SEAL)
Attest:

EDWARD M.FLETCHER, JR.
Attesting Officer

ROBERT GOTTSCHALK
Commissioner of Patents